April 22, 1941.    G. E. FRANCK    2,239,169

SAFETY VALVE

Filed April 17, 1939

INVENTOR.
George E. Franck,
BY Bair & Freeman
ATTORNEYS.

Patented Apr. 22, 1941

2,239,169

UNITED STATES PATENT OFFICE 2,239,169

SAFETY VALVE

George E. Franck, Berwyn, Ill., assignor to The Imperial Brass Manufacturing Company, Chicago, Ill., a corporation of Illinois Application April 17, 1939, Serial No. 268,303

1 Claim. (Cl. 137—53)

My invention relates to safety valves and particularly those of a type employing a rupturable disc which are so designed that they remain absolutely sealed until a predetermined pressure is exceeded whereupon the disc will abruptly break in order to release the pressure therein.

Among the objects of my invention is the provision of a new and improved safety release valve provided with a rupturable element, together with a resealing means which will operate to close the valve after the element has been ruptured.

Another object is the provision of a new and improved safety valve having a plurality of releasing devices including a frangible disc adapted to be ruptured at a predetermined high pressure of fluid behind the valve and a resiliently seated valve operable at a pressure lower than the fluid pressure necessary to rupture the disc so that after the breaking of the disc has served its purpose and the pressure is reduced to a substantial amount below that necessary to break the disc, the auxiliary valve will become reseated to prevent any further escape of fluid through the valve, and to act as a relief valve independently of the disc.

Still another object is the provision of a new and improved safety valve including distinct releasing features, one comprising a resiliently leasing valve and the other a rupturable disc so positioned within the outlet of the valve that it can be removed when ruptured and replaced without disturbing the assembly of the valve portion of the device.

A further object is the provision of a new and improved safety valve which includes in addition to a rupturable disc a spring pressed valve member seated upon a valve seat at the inlet to the valve and provided with a flexible metallic portion sealed in such a manner as to prevent escape of any fluid from the valve device to any point other than the normal outlet provided therefor, said valve being so constructed that it may be adjusted to a definite predetermined resilient pressure while at the same time permitting absolute tightening of the valve without interference or variation of pressure for which it is designed.

With these and other objects in view, my invention consists in the construction, arrangement and combination of the various parts of my device whereby the objects contemplated are attained, as hereinafter more fully set forth, pointed out in my claim and illustrated in the accompanying drawing, in which:

Figure 1:
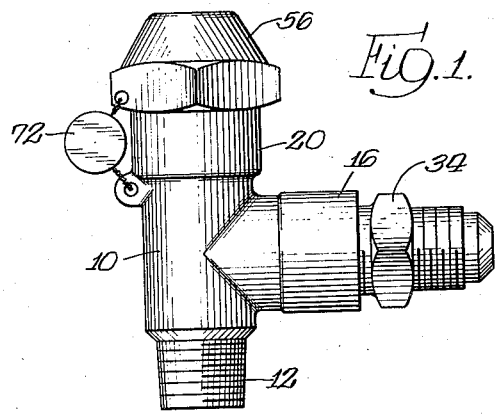
Figure 1 is a horizontal elevation of the safety valve device.
Figure 2:
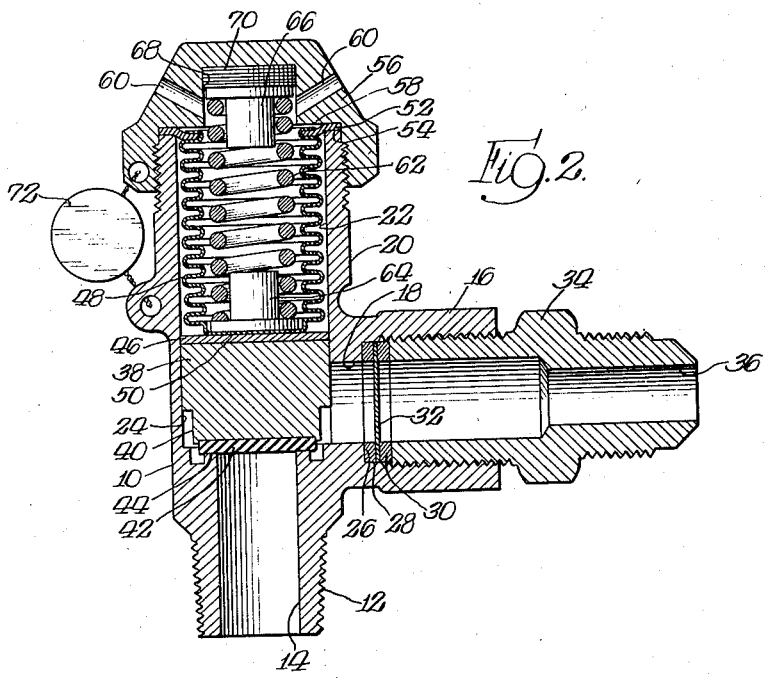
Figure 2 is a horizontal view in section drawn to a slightly larger scale.

In the operation of refrigeration machines there is constantly present the problem of confining a volatile gas, frequently a rather expensive gas, but at the same time providing a safety release in case the gas pressure should get beyond a safe amount. In addition to these problems there is the ever-present necessity of venting refrigeration gases to the atmosphere or to some collector when the pressure exceeds a predetermined amount in order that these gases, obnoxious and at times poisonous, may not be permitted to escape into space occupied by human beings.

Due particularly to the highly volatile character of the gases only the very tightest seals are capable of preventing escape. For this reason spring loaded safety valves of the ordinary character have been found unsuccessful. Frequently after such a valve has once operated to permit the escape of gas, it does not readily seat itself again with sufficient tightness to prevent subsequent leakage of gas past the valve seat.

In order to provide an absolutely tight safety valve but in addition one which will release the pressure when necessary, it has been found that a rupturable disc satisfies the purpose when built into a valve of the proper sort. Here again, however, in order that a valve equipped with a disc may operate properly there must be provided in addition to the rupturable disc a valve which will shut off the escaping pressure at some point below the maximum for which the disc is set in order that all of the contents of a refrigeration machine might not be exhausted past the ruptured disc after danger from high pressure has passed.

There has accordingly been provided in this invention such a valve with a double safety feature, namely, that of a rupturable disc and a spring pressed release valve.

In the drawing the character 10 indicates a valve body provided with a threaded lower projection 12 for an inlet 14. Another projection 16 is provided with an outlet 18 while a third projection 20 is provided with a pocket 22 for housing certain valve elements.

Within the body 10 there is likewise formed a chamber 24 which is in reality an extension of the pocket 22, but which in practice forms a separate central space within the valve body.

Within the outlet 18 there is provided a rim 26 and resting upon the rim is a pair of rings 28 and 30. These rings, of a more or less compressible character, are designed to hold between them a rupturable diaphragm or disc 32 and are pressed tightly into place by means of a threaded plug 34. The plug, applicable in any of a variety of forms, is provided with a central passage 36 to permit escape of gas whenever the disc might be ruptured.

In addition to the rupturable disc there is provided a spring pressed valve member comprising a valve element 38 having a recessed portion 40 at the lower end and a face portion 42 inset in the lower face. There is provided a valve seat 44 in the chamber 24 at the innermost end of the inlet 14 with which the valve element 38 cooperates. A washer 46 is additionally provided at the top of the valve element to provide a snug fit for the element within the pocket 22.

In order to seal the pocket a flexible metal bellows 48 may be used in inverted position so that the bellows head 50 bears against the washer at the top of the valve element. The flange or rim 52 of the bellows overlaps the upper rim 54 of the pocket 22 and is designed to be sealed upon the rim by means of a cap 56 which threadably engages the upper portion 20 of the valve body. The flat bottom 58 of the recess in the cap supplies a shoulder or surface for pressing the flange of the bellows in sealed relation to the rim of the projection 20. To permit the bellows to flex properly there are provided vent holes 60 in the cap.

A coiled spring 62 is mounted within the bellows and surrounds a spring keeper 64 at the bottom which is designed to keep the spring out of direct contact with the bellows head and to position the spring properly therein. At the opposite end there is provided a second spring keeper 66 which fits into a pocket 68 in the cap. In order that proper tension may be applied to the spring 62 provision is made for a series of adjusting discs 70 resting above the upper spring keeper between itself and the bottom of the pocket 68. Any suitable number of adjusting discs can be placed therein in order to vary the tension upon the spring 62 depending upon the type of refrigeration gas being handled and the pressure at which the rupture disc 32 is designed to break. A seal 72 is provided for the purpose of showing when the valve portions of the device were assembled and sealed.

In operation, the portion 12 is screwed into a container wherein there is volatile gas under pressure. As the pressure rises to a dangerous amount first the valve element 38 is raised moving the lower face 42 from the valve seat 44. Thus, the fluid under pressure will tend to fill the chamber 24 and impinge against the rupturable disc 32. This gas, however, will not escape from the chamber, neither past the disc nor past the sealed metal bellows at the top of the pocket 22. While the pressure remains below the rupture point of the disc nothing further will happen in the valve, which upon cessation of the pressure will reseat itself. There is no likelihood of gas escaping, however, in case of improper reseating since there is no place where fluid can escape.

When the pressure exceeds the amount for which the disc 32 is constructed, the gas in the chamber 24 now under high pressure will burst the rupturable disc and escape through the outlet 36 connected preferably outside the building or structure in which the equipment may be installed. As the pressure in the refrigeration system lowers as a result of this escaping gas it will continue to lower below the point at which the disc ruptured. When the pressure finally reaches a point below that for which the valve device is set the valve element 38 will be spring pressed back against the valve seat 44 and prevent any further loss of the refrigerant gas. The seating, of course, may not be perfect so additional small quantities of the gas may be lost past the seat. These valves, however, are subjected to frequent inspection for ruptured discs. Whenever the inspector may find a ruptured disc 32 he can then replace it with another new disc without it becoming necessary to shut off refrigeration through any part of the device or without it further being necessary to disassemble any other part of the device except the plug securing the rupturable disc itself. In addition, once the disc has been ruptured the resiliently seated valve device will continue to act as a safety valve, releasable at a slightly lower pressure than the disc.

It will thus become evident that a safety device which will absolutely operate at predetermined pressures has been provided but that there is also incorporated in this embodiment means for preventing undue escape of gas and for retaining the greater portion of gas within the machine after the rupturable safety disc has been ruptured.

Some changes may be made in the construction and arrangement of the parts of my device without departing from the real spirit and purpose of my invention, and it is my intention to cover by my claim any modified forms of structure, or use of mechanical equivalents, which may be reasonably included within its scope.

I claim as my invention:

A safety valve device comprising a valve body having an inlet including a valve seat therein, an outlet, a pocket, and a valve member in said pocket comprising a valve element provided with a disc making a sealing slidable fit in said pocket adapted to be positioned on said seat, a sealing element having the central portion positioned adjacent the valve element and the outer portion sealed at the outer end of said pocket, a spring keeper on said sealing element on the side opposite said valve element, a coiled spring having one end engaging said keeper, a second spring keeper free from contact with the valve and the valve body at the opposite end of the spring, a cap threadably engageable with the valve body for holding said keepers and the spring in operative position, and removable discs positioned between the second keeper and said cap adapted to provide variable tension for the spring.

GEORGE E. FRANCK.